Oct. 10, 1967 W. F. OLASHAW 3,346,776
BUS BAR SUPPORTING AND INSULATING ASSEMBLY HAVING
BACK-TO-BACK BUS BAR RECEIVING CHANNELS
Filed Dec. 17, 1965 3 Sheets-Sheet 1

INVENTOR.
WILLIAM F. OLASHAW
BY Robert T. Casey
ATTORNEY

Oct. 10, 1967  W. F. OLASHAW  3,346,776
BUS BAR SUPPORTING AND INSULATING ASSEMBLY HAVING
BACK-TO-BACK BUS BAR RECEIVING CHANNELS
Filed Dec. 17, 1965  3 Sheets-Sheet 3
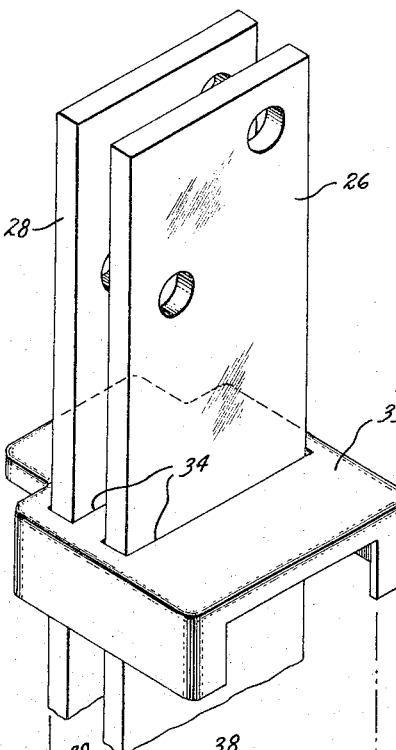
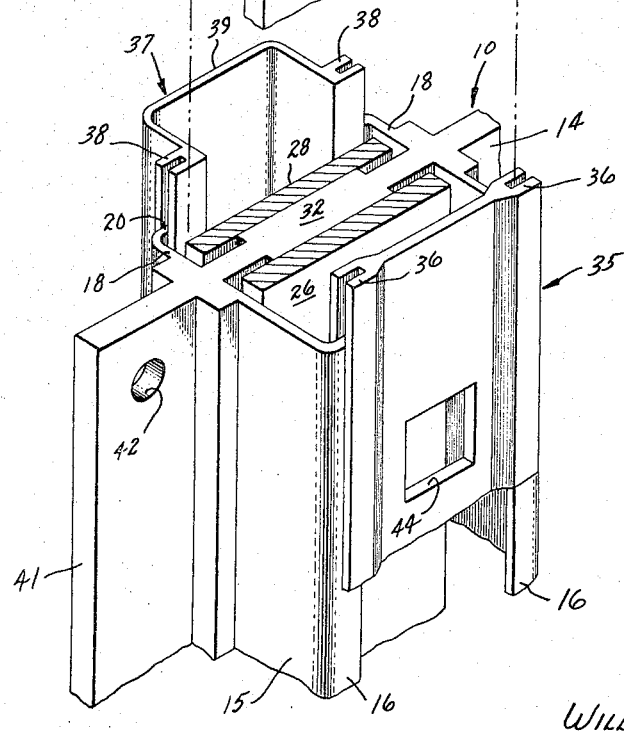
FIG. 5
INVENTOR.
WILLIAM F. OLASHAW
BY Robert F. Casey
ATTORNEY United States Patent Office 3,346,776
Patented Oct. 10, 1967

3,346,776
BUS BAR SUPPORTING AND INSULATING ASSEMBLY HAVING BACK-TO-BACK BUS BAR RECEIVING CHANNELS
William F. Olashaw, New Britain, Conn., assignor to General Electric Company, a corporation of New York
Filed Dec. 17, 1965, Ser. No. 514,594
11 Claims. (Cl. 317—117)

ABSTRACT OF THE DISCLOSURE

An insulated busway assembly is provided having an integrally formed insulating panel with a plurality of pairs of back-to-back, longitudinally extending busbar-receiving channels. A bus bar is mounted in each channel by fastening means extending through the back wall of the channel. Each channel is defined by a pair of rib portions extending outwardly from the panel and removably engaged with these rib portions are insulating closure strips which may have openings to permit entry of contact stabs to contact the busbars.

BACKGROUND OF THE INVENTION

1. Field of the invention

The present invention relates to electrical distribution apparatus, and more particularly, to insulated busways for such apparatus.

2. Description of the prior art

Systems for distribution of electrical current, with direct or alternating current to a multiplicity of motors or other load devices require heavy duty conductors or busways, which may be in the form of essentially flat bars or have more complex configurations. If left uninsulated, or only partially insulated, bus conductors connected to a source of electrical current pose an appreciable hazard to operating personnel who may have occasion to make or break connections to motor starters or similar load devices. Uninsulated or only partially insulated conductors also present a risk of damage to associated equipment in the event of overload or improper connection. In addition, most bus supporting insulators act as dust catchers and breeding places for short circuits and are difficult and cumbersome to disassemble for repair, replacement or cleaning. These bus insulators usually provide ineffective support which is conducive to misalignment of the bus conductors with the resultant likelihood of faulty contact of the connectors to motor starters or other load devices.

Summary of the invention

It is an object of this invention to provide a novel insulated busway assembly which provides effective insulating support for the busbars therein and is relatively inexpensive to manufacture.

It is also an object to provide such a busway assembly which has an insulating support member which is integrally formed and provides a plurality of longitudinally extending busways.

Another object is to provide such a busway assembly that has readily removable panels for repair, replacement or cleaning of busbars supported therein.

A further object is to provide such a busway assembly which is adapted to receive electrical probes for connection to busbars supported therein and to serve as a compartment isolating wall for an electrical control cabinet or similar device.

Other objects and advantages of the invention will be in part pointed out and in part become obvious from the following detailed description.

It has now been found that the foregoing objects and advantages can be readily attained in an insulated busway assembly having an integrally formed insulating member with a plurality of spaced apart, longitudinally extending busway portions and a base portion extending therebetween. Each busway portion is defined by a pair of rib portions extending outwardly from the base portion and longitudinally thereof to form an insulated channel therebetween for retaining a busbar in spaced insulated relationship from busbars retained in other busway portions. Removably engaged with each of the pairs of rib portions and extending therebetween are insulated closure panels which cooperate with the busway portions to provide insulated enclosures for the busbars received in the busway portions. At least one of the cover panels has at least one aperture therein which will receive a probe for contact with a busbar received in its busway portion.

In the preferred embodiment, the rib portions have flange portions spaced outwardly from the base portion which extend toward each other and the closure panels have U-shaped portions extending along the sides thereof which slidably seat on the flange portions so that the panels may be fitted upon and removed from the insulating member by longitudinal movement thereon. The cover panel desirably has a generally concave cross section to guide a probe into the aperture formed therein and directed toward the busbar.

According to one aspect of the present invention, a pair of busway portions are aligned on opposite surfaces of the base portion so that busbars may be supported in insulated, back-to-back relationship. Thus, by providing apertures in the base portion between the rib portions, probes may extend through a cover panel on one surface and into a probe on the busway portion on the other surface.

In the preferred embodiment of this invention, the insulating member is provided with a plurality of parallel, longitudinally extending busway portions spaced along both surfaces of the base portion with the busway portions on opposite surfaces being aligned so as to support two busbar conductors in back-to-back relationship in a single or plural phase electrical distribution system. However, it will be apparent that the aligned busway portions of such a structure carry single busbars in side-by-side relationship with probes being insertable through apertures in the cover panels on either side and in the base portion. In such a form, the base portion acts as a web connecting laterally adjacent busway portions and forming a generally planar wall member which may be attached to a suitable support such as an electrical cabinet thereby forming a wall enclosure of the cabinet. The busway assembly may be adapted to receive probes for electrical engagement of electrical equipment supported in the cabinet with the busbar conductors supported therein.

The insulating member may be integrally formed from synthetic plastic or other insulating material, conveniently by extrusion since the configuration lends itself to fabrication in this manner. The cover panels may be similarly formed conveniently by extrusion since this configuration also lends itself to this fabricating technique.

The invention will be more fully understood from the following detailed description and the scope will be pointed out in the appended claims.

Description of the drawings

In the drawings.

FIGURE 5 is a fragmentary perspective view, partially in section and partially exploded, of the insulated busway assembly;

FIGURE 7 is a fragmentary cross-sectional view of a further embodiment of the busway assembly of this invention showing a pair of stabs inserted therein.

Figure 3:
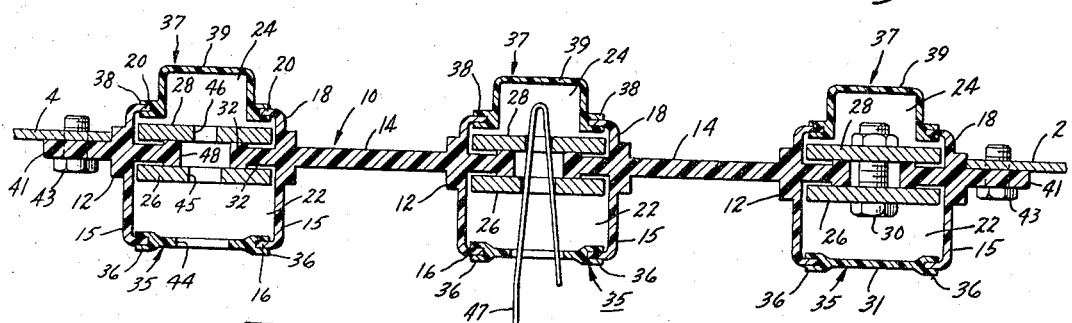
FIGURE 3 is a fragmentary cross-sectional view of the busway assembly with a stab inserted into one of the busways.

Referring now in detail to FIGURES 3 and 5 of the attached drawings, there is illustrated an insulated busway assembly embodying the present invention and having an integrally formed insulating member, generally designated by the numeral 10, which has a plurality of longitudinally extending busway portions 12 connected by a generally planar base or web portion 14 which extends longitudinally between the busway portions 12. On one surface of the base portion 14, each busway portion 12 has a pair of parallel, outwardly and longitudinally extending rib portions 15 which have flange portions 16 on the outer ends thereof which extend toward each other. On the other surface of the base portion 14, the busway portions 12 have rib portions 18 with flange portions 20 similar to the rib portions 15 except that the rib portions 15 extend outwardly from the base portion 14 a substantially greater distance than the rib portions 18.

The pairs of rib portions 15 and 18 form parallel aligned channels on opposite sides of the insulating member 10 thereby defining front and rear busways 22 and 24 having busbars 26 and 28 disposed respectively therein which are secured to opposite sides of the insulating member 10 by nut and bolt fasteners 30. If it is desired to carry separate circuits in busbars 26 and 28, the nut and bolt fasteners 30 may be made of insulating material, or other insulated means may be used to support the busbars 26 and 28 in the insulating member 10. The base or web portion between the rib portions 15, 18, separates the front and rear busways 22 and 24 and provides a continuous body for the insulating member across the several pairs of rib portions 15, 18. The base or web portion also has a spacer portion 32 of greater thickness than the remainder thereof between the rib portions 15, 18, which provides a platform for the busbars 26 and 28. A removable cap 33 having apertures 34 with busbars 26 and 28 extending therethrough is provided on each end of the insulating member 10 to prevent dust and foreign matter from entering the busways 22 and 24.

Removably mounted on the flange portions 16 of the pairs of rib portions 15 are elongated front cover panels, generally designated by the numeral 35 which have a generally planar body portion 31 and generally U-shaped portions 36 extending longitudinally along the sides thereof. The flange portions 16 are disposed in the U-shaped portions 36 so that the front panels 35 are slidable longitudinally on the busway portions 12 providing removable covers for the front busways 22. Similarly, channel-shaped rear cover panels, generally designated by the numeral 37, are removably mounted on the flange portions 20 of the pairs of rib portions 18 and have a convex, generally U-shaped body portion 39 and a pair of outwardly facing U-shaped portions 38 extending longitudinally along the sides thereof. The flange portions 20 are disposed in the U-shaped portions 38 so that the rear cover panels 37 are also slidable on the busway portions 12 providing removable covers for the rear busways 24.

As previously indicated, the insulated busway assembly of this invention may have an insulated member 10 with a single pair of aligned busway portions 12 and a web or base portion for mounting on a support, or the busway assembly may consist of a plurality of aligned, parallel extending busway portions 12 for insulating and supporting busbars carrying current from a multi-phase source.

As illustrated, the web or base portion 14 is of increased thickness about the outer surface of the rib portions 15, 18 to provide reinforcement thereat. The base portion 14 not only extends between the busway portions 12 for connecting these parts together but also extends beyond the outermost busway portions to form mounting portions 41 at the sides thereof with apertures 42 therein for securing the insulating member 10 to suitable supports 2, 4 by means of fasteners 43.

Apertures 44 are provided in the front cover panels 35 which are aligned with apertures 45 in the front busbars 26 and smaller apertures 46 in the rear busbars 28 which are suitably configured to receive a connector such as stab 47 for engagement with the busbars 26 and 28. Aligned cooperating apertures 48 are provided in the spacer portion 32 of the insulating member 10 so that the stabs may pass therethrough into the aperture 46 for engagement with the rear busbar 28. In this manner, the busway assembly is adapted to carry auxiliary bus conductors providing electrical outlets for load panels or similar devices. However, the insulated busway assembly of this invention may be used as an insulated bus duct for a principal bus conductor between an electrical source and a load device.

Figure 2:
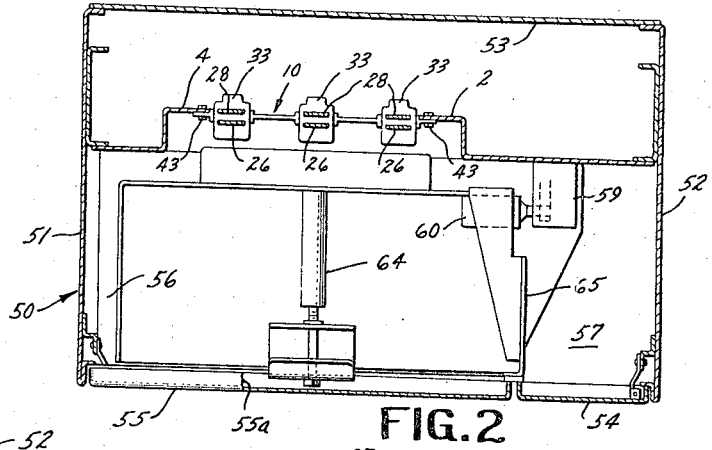
FIGURE 2 is a top view of the apparatus cabinet of FIGURE 1 with the top removed to show the location of the busway assembly of the present invention.
Figure 1:
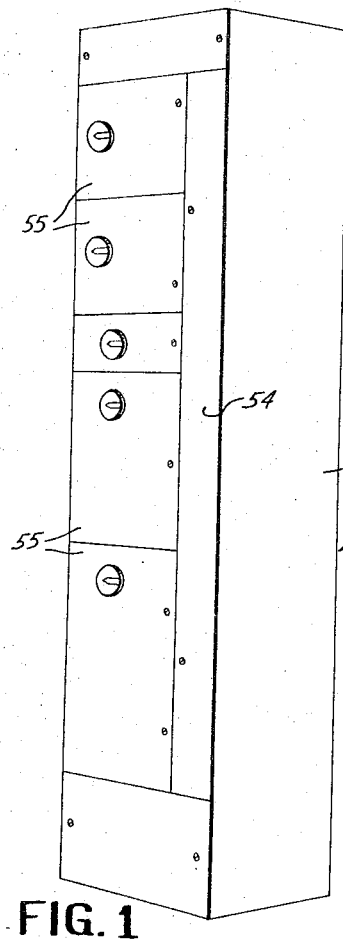
FIGURE 1 is a perspective view of a multi-compartment electrical control apparatus cabinet employing the busway assembly of the present invention.
Figure 6:
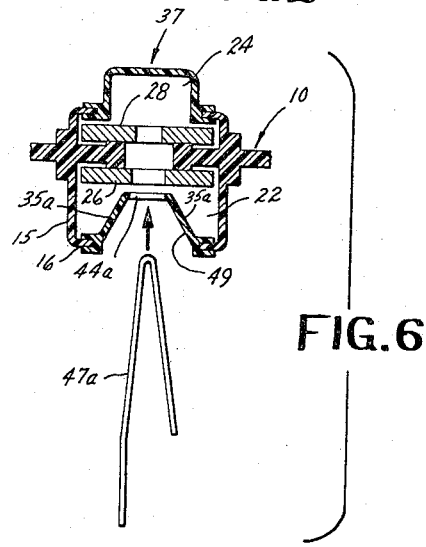
FIGURE 6 is a fragmentary cross sectional view of another embodiment of the busway assembly of this invention with a fragmentarily illustrated stab positioned for insertion in the busway assembly.

Referring now to FIGURE 6, therein illustrated is another embodiment of the front panel of the busway assembly wherein the front panel generally designated by a numeral 35a has a generally concave and partially U-shaped, inwardly projecting body portion 49 instead of the planar shape of panel 35 in FIGURES 1–5 so that the stab 47a is guided into the aperture 44a and into engagement with the busbars 26 and 28 allowing for minor misalignments of the stabs 47a.

The insulating member 10 and the panels 35, 37 and 35a are readily constructed by pressing, extruding, or molding from suitable insulating materials such as polyester or other synthetic resin, which may be reinforced by filaments or fibers of glass or synthetic resins to form relatively rigid members. The probe receiving apertures may be molded in the insulating member 10 and the panels 35, 37 and 35a or may be punched or drilled therein after sheet formation, as may be the bolt holes for securing the busway assembly to support or any other opening as may be desired. As previously indicated, the illustrated configuration lends itself to extrusion for rapid and economical operation. In accordance with conventional construction, the bus conductors are made of copper or other material of good electrical conductivity and may be conveniently formed in flat bars or other configurations by pressing, stamping, or other similar operations.

As mentioned previously, the busway assembly of this invention provides effective lateral support for the busbars retained in the channeled insulating member 10. The busway assembly of this invention may be adapted for similar use with other bus conductors than those illustrated and described herein and the overall configuration of the insulating member 10 and busway portion 12 may be altered to accommodate generally channel-shaped or other type bus conductors while still retaining the advantage of providing effective lateral support for the conductors with the integrally formed insulating member 10. When the busway assembly is used to provide electrical outlets, the number, shape, and spacing of the probe-receiving apertures may be varied without involving a departure from the inventive concept. The busway assembly described above is especially advantageous in a three phase electrical distribution system and in cabinet structures for electrical apparatus.

As seen in FIGURES 1–4, the busway assembly of this invention is adapted for use with a cabinet for electrical control apparatus to provide bus support, electrical outlets and a compartment isolating wall. The multi-compartment cabinet or motor control center, generally designated by the numeral 50, for electrical control apparatus is fully described in United States Patent No. 3,170,092, issued Feb. 16, 1965, to A. H. Adams and W. F. Olashaw, and assigned to the same assignee as the present invention.

Generally, the cabinet 50 is a box-like structure having parallel spaced apart side walls 51 and 52, and a back wall 53, top and bottom walls (not shown) and a plurality of front access doors 54, 55. The doors 55 are of modular height and each individually covers one of a plurality of compartments defined by a plurality of shelves 56 within the cabinet 50. The compartment doors 55 are each hinged to the cabinet side wall 51 and close against a common stop for the door 54 and all the doors 55. Intermediate the front and the back walls of the cabinet 50 and extending transversely between the side walls 51 and 52 is a dividing wall and a bus duct structure including a pair of substantially coplanar and imperforate mounting plates or brackets 2, 4 fixed to and extending vertically along the opposite side walls of the cabinet 50 and having their juxtaposed edges spaced apart to define a bus duct opening. Within the opening thus defined and fixed to the interior ends of the plates or brackets 2, 4, is secured the mounting portion 41 of the insulating member 10 of the substantially imperforate wall-like busway assembly of the present invention. The busway assembly thus serves as a rear compartment wall on which are mounted a plurality of pairs of fully insulated busbars 26 and 28.

The several apparatus compartments in the cabinet 50 are defined by the horizontal shelves 56 each having its rear edge lying upon the mounting plates 2, 4 and one side edge closely adjacent to the cabinet side wall 51. One side of each shelf 56 is spaced from the cabinet side wall 52 to leave an open side wiring channel 57 extending substantially the full length of the cabinet 50. The shelves 56 are supported at these open sides by suitable forwardly extending brackets (not shown) fixed to the mounting plate 2. The opposite side of each shelf 56 is removably seated upon a suitable bracket on the cabinet side wall 51 and the rear edge of each shelf overlies a channel-shaped horizontal supporting bar 58 fixed to the mounting plates 2, 4 and extends across the front of the bus duct.

To improve electrical isolation between the several apparatus compartments the rear mounting bar 58 for each shelf 56 is provided with rearwardly extending ears 58a disposed to extend between the busway portions 12 of the insulating member 10 and thus to interfit closely in contiguous complemental relation with the insulating member 10 across its entire surface. These ears 58a serve as barriers to inhibit transfer of arcs or ionized gases between adjacent apparatus compartments. The barriers or ears 58a may, if desired, be formed as integral parts of the shelves 56 rather than as parts of the supporting bars 58.

Within the wiring channel 57 and adjacent each unit compartment there is mounted upon the plate 2 a slide contact terminal block 59 disposed for contact engagement with a cooperating terminal block 60 carried by each apparatus unit 61. These contact blocks and their cooperation with certain other features of cabinet structure disclosed herein are more fully described in United States Patent No. 3,168,683, issued Feb. 2, 1965, to Robert W. Brokaw and assigned to the same assignee as the present invention. To improve isolation between the terminal blocks 59 the open ends of the shelves 56 have tapered portions 56a extending into the wiring channel at the rear to serve as barriers between the terminal blocks 59. The apparatus units 61 will be more fully described hereinafter.

To further improve compartment isolation the shelves 56 are provided along their front edges with strips 56b of gasket material against which inturned upper and lower edges 55a, 55b of the compartment doors 55 seat in sealing relation. Thus the cabinet structure itself provides very effective isolation at top, bottom, front, rear and one side of each compartment by reason of the closely contiguous disposition of the shelf against the rear bus duct wall, against one cabinet sidewall and against the compartment doors. At the opposite side the shelf opens into the side wiring channel 57, and at this side effective isolation is provided by the shelf barriers 56 and by sealing engagement of the cabinet doors with the removable apparatus units 61 in a manner more fully described below.

Figure 4:
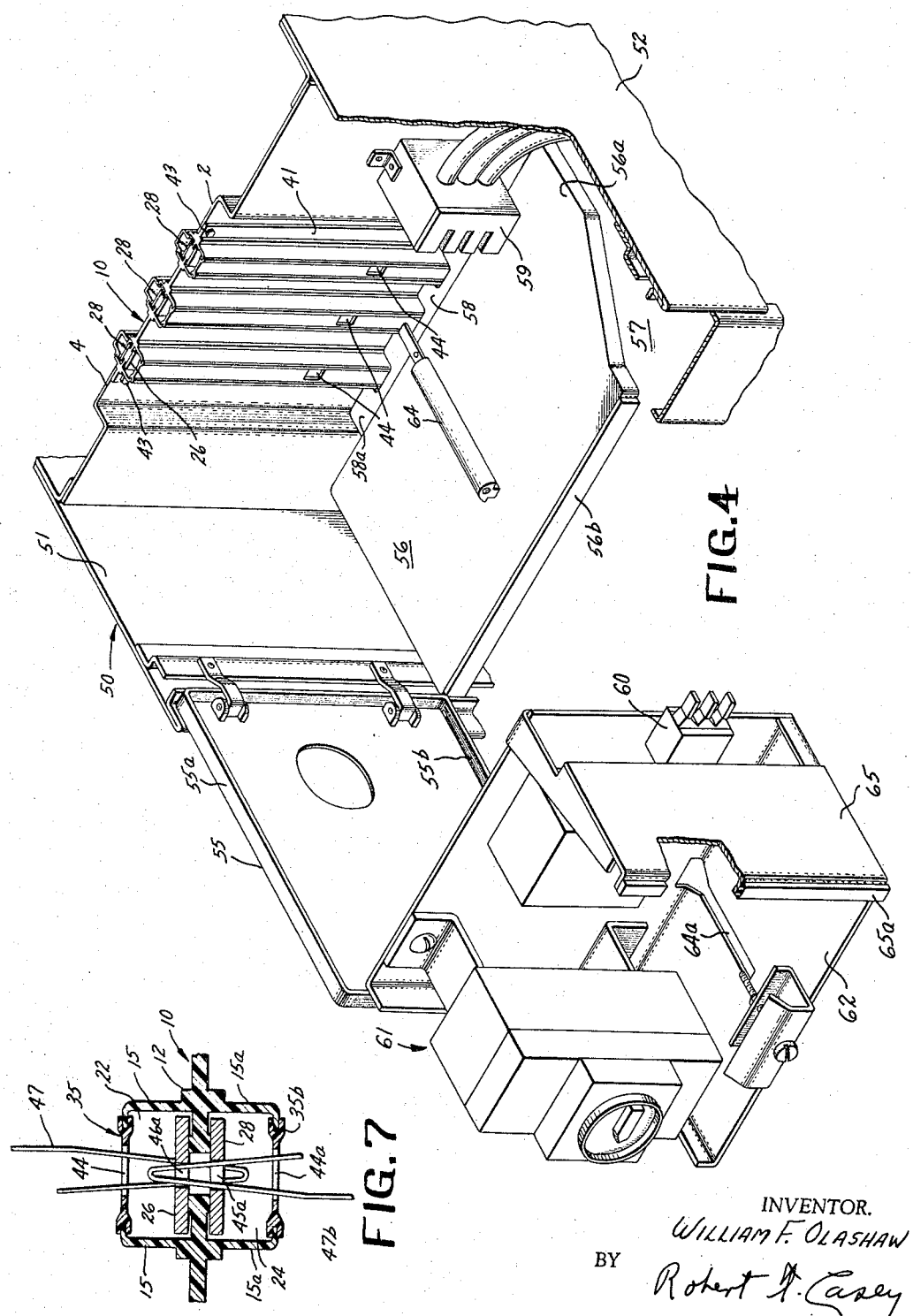
FIGURE 4 is a fragmentary perspective view of a single cabinet compartment showing a removable control unit in withdrawn position for clarity of illustration.

Referring particularly to FIG. 4, each removable apparatus unit 61 comprises an L-shaped base plate 62 having a bottom wall seating on the cooperating shelf 56 and a rear wall adapted to lie against the front of the bus duct insulating member 10. As generally indicated in the drawing, each unit base plate 62 has mounted thereon suitable electrical control apparatus, such as switches, relays and the like, and provides at the rear thereof a plurality of connecting stabs similar to stab 47 disposed for insertion into the front apertures 44 of the bus duct. Each unit base 62 is so positioned on the shelf 56 by means of a guide bar 64 on the shelf and cooperating slots 64a in the base that it is laterally offset in the cabinet, thereby leaving the wiring channel 57 open. The terminal block 60 is fixed to the unit base 62 at the side adjacent the wiring channel and is disposed for cooperative engagement with the terminal block 59 in the cabinet. At this same side of the unit base 62 there is also provided a partial sidewall or barrier 65 which, when the unit is in position, defines one side wall of the apparatus compartment. The sidewalls 65 of the several apparatus units are in coplanar alignment vertically along one side of the cabinet and spaced from the adjacent sidewall 52 thereof, thereby to define one sidewall of the wiring channel 57. The unit sidewalls or barriers 65 terminate somewhat short of the back wall of the unit base 62 in order to leave space for mounting upon such back wall the movable terminal block 60, the contacts of which must extend into the wiring channel 57 for engagement with the block 59.

The front edges of the aligned unit barriers 65 are each turned over to form a plurality of vertically aligned flanges which together provide a common stop for all the doors 54 and 55. Each barrier provides a stop for one individual unit door 55 and the aligned barriers serve also as a stop for the separate wiring channel door 54. Preferably a strip of gasket material 65a overlies the front edge of the flange of each barrier 65 to improve sealing against the doors and thus improves compartment isolation. The shelf side extensions 56a protrude beyond the barrier walls 65 and partially into the wiring channel 57 thereby to further improve isolation between the cabinet contact blocks 59.

The busway assembly of this invention is readily constructed and assembled into an enclosed insulated busway as the front panel 35 and the rear panel 37 are slidable on the busway portion 12 and may be easily removed for repairs and replacement of the busbars 26 and 28. When the busway assembly is used as the back wall of cabinet 50, it may be easily removed by unfastening bolts 43 for working on the busbar assembly or for replacing it with a new unit.

FIGURE 7 illustrates another embodiment of the busway assembly wherein stabs may be inserted from opposite sides of the busway portion 12. In this embodiment, the rear cover panel 37 and the rib portions 18 shown in the embodiment of FIGURE 3 have been replaced by the cover panel 35b and the rib portions 15a. An aperture 44a is provided in the cover panel 35b which is aligned with the aperture 45a in the busbar 28 and a smaller aperture 46a in the busbar 26. These apertures are suitably configured to receive a stab 47b for engagement with the busbars 26 and 28. The stab 47 is inserted into the busway portion 12 in the same manner previously set forth with respect to the embodiment of FIGURE 3. As shown in FIGURE 7, the stabs 47 and 47b are offest relative to each other in order to provide for clearance therebetween.

It is contemplated within the scope of the present invention that the panels 35, 35a, 35b, and 37 may be made of a clear material in order to afford a means of visually inspecting the engagement of the stabs with the busbars.

Thus, the invention conveniently and economically provides an insulated light-weight busway assembly which may provide for any number of channels such as for three busways for a conventional three phase circuit, and to support individual or combinations of bus conductors over substantially their entire length so that each busway is completely isolated from the other busways. The busway assembly is constructed with an integrally formed insulating member providing parallel, longitudinally extending channels defining the busways for supporting the busbars in insulated relationship. Since the insulating member of the busway has high strength and is rugged, the likelihood of adjacent contact of a conductor contained in the busway assembly is minimized, as is the possibility of short circuiting between conductors in adjacent busways. The entire assembly is kept free from dust collecting surfaces and has removable panels for repairing or replacing the busbars. The busway assembly is readily supportable for fastening on its side edges to a suitable structure and no other mounting for the bus conductors is necessary. The bus assembly may be adapted for convenient installation on a motor control cabinet or similar device wherein the busway assembly forms the back wall portion and also supports busbars in insulated relationship on the back of the cabinet and provides electrical outlets.

It is well understood that various changes in the details, materials, and arrangement of parts, which have been herein described and illustrated in order to explain the nature of the invention, may be made by those skilled in the art within the principle and scope of the invention are expressed in the claims.

Having thus described the invention, I claim:
1. An insulated busway assembly comprising:
 (a) a generally planar sheet of insulating material having a plurality of pairs of back-to-back busbar receiving channels in parallel spaced side-by-side relation;
 (b) said planar sheet including dividing wall portion extending between said busbar receiving channels of each of said pairs thereof, and upstanding side walls;
 (c) a busbar retained in at least one busbar receiving channel of each of said pairs thereof;
 (d) fastening means fastening said busbar to said planar sheet, said fastening means comprising securing means passing through said dividing wall portion and engaging a retaining member on the opposite side thereof; and
 (e) insulating closure means closing each of said channels containing a busbar.

2. The busbar assembly of claim 1 wherein said insulating closure means has at least on aperture therein for permitting access to said busbar.

3. The busway assembly of claim 1 wherein:
 (a) said upstanding side walls have flange portions extending toward each other outwardly from said dividing wall portion; and
 (b) said insulating closure means for each of said channels comprises an insulating closure panel having interfitting portions extending along the sides thereof which slidably engage said flange portions for insertion and removal of said panel by longitudinal sliding movement.

4. The busway assembly of claim 3 wherein:
 (a) each of said insulating closure panels has at least one aperture therein for receiving a probe for contact with said busbar.

5. An insulated busway assembly comprising:
 (a) a generally planar sheet of insulating material having a plurality of pairs of back-to-back busbar receiving channels in parallel spaced side-by-side relation;
 (b) said planar sheet including a dividing wall portion extending between said busbar receiving channels of each of said pairs thereof, and upstanding side walls;
 (c) a busbar retained in each of said busbar receiving channels in juxtaposed relation to said dividing wall portion;
 (d) fastening means fastening each of said busbars to said planar sheet, said fastening means comprising securing means passing through said dividing wall portion and interconnecting the busbars in each of said pairs of back-to-back channels; and
 (e) insulating closure means closing each of said busbar receiving channels.

6. The busway assembly of claim 5 wherein said insulating closure means has at least one aperture therein for permitting access to at least one of said busbars.

7. The busway assembly of claim 5 wherein:
 (a) said upstanding side walls have flange portions extending toward each other outwardly from said dividing wall portion; and
 (b) said insulating closure means comprises an insulating closure panel having interfitting portions extending along the sides thereof which slidably engage said flange portions for insertion and removal of said panel by longitudinal sliding movement.

8. An insulated busway assembly comprising:
 (a) a generally planar sheet of insulating material having a plurality of busbar receiving channels, said busbar receiving channels being in parallel spaced side-by-side relation and opening in the same general direction;
 (b) each of said busbar receiving channels being defined by a back wall portion substantially co-planar with the general plane of said sheet of insulating material and a pair of spaced upstanding side walls extending outwardly from said back wall portion;
 (c) a busbar retained in each of said busbar receiving channels in juxtaposed relation to said back wall portion;
 (d) fastening means fastening each of said busbars to said planar sheet; and
 (e) an insulating closure panel closing each of said busbar receiving channels, each of said closure panels having a plurality of apertures therein for permitting access to said busbar by contact probes of electrical devices.

9. The busway assembly of claim 8 wherein said fastening means comprises securing means passing through said busbar and said back wall portion and engaging a retaining member on the opposite side thereof.

10. In combination with a multi-compartment cabinet for removably mounting and enclosing a plurality of unit assemblies of electrical apparatus electrically engaged with busbars supported in said cabinet, the improvement which comprises an insulated busway assembly supported in said cabinet comprising:
 (a) a generally planar sheet of insulating material having a plurality of pairs of back-to-back busbar receiving channels, said pairs of busbar receiving channels being in parallel spaced side-by-side relation;
 (b) said planar sheet including dividing wall portion extending between said busbar receiving channels of each of said pairs thereof, and upstanding side walls;
 (c) a busbar retained in at least one busbar receiving channel of each of said pairs thereof;
 (d) fastening means fastening said busbars to said planar sheet, said fastening means comprising securing means passing through said dividing wall portion; and
 (e) insulating closure means closing each of said channels containing a busbar.

11. In combination with a multi-compartment cabinet for removably mounting and enclosing a plurality of unit assemblies of electrical apparatus electrically engaged with busbars supported in said cabinet, the improvement which comprises an insulated busway assembly supported in said cabinet comprising:

(a) a generally planar sheet of insulating material having a plurality of pairs of back-to-back busbar receiving channels, said pairs of busbar receiving channels being in parallel spaced side-by-side relation;

(b) said planar sheet including dividing wall portion extending between said busbar receiving channels of each of said pairs thereof, and upstanding side walls;

(c) a busbar retained in each of said busbar receiving channels in juxtaposed relation to said dividing wall portion;

(d) fastening means fastening each of said busbars to said planar sheet, said fastening means comprising securing means passing through each of said busbars and said dividing wall portion and engaging a retaining member located on one side thereof; and (e) insulating closure means closing each of said busbar receiving channels.

References Cited
UNITED STATES PATENTS

| 291,399 | 1/1884 | Randall | 174—47 |
| 2,482,310 | 9/1949 | Adam. | |
| 3,096,131 | 7/1963 | Adams | 317—119 |
| 3,126,444 | 3/1964 | Taylor | 174—101 |
| 3,170,092 | 2/1965 | Adams et al. | |

FOREIGN PATENTS 609,943  10/1960  Italy.

ROBERT S. MACON, *Primary Examiner.*

ROBERT K. SCHAEFER, *Examiner.*

D. SMITH, *Assistant Examiner.*